Jan. 17, 1928. 1,656,657
R. A. ASHMAN
CARBURETOR
Filed March 14, 1925 2 Sheets-Sheet 1

Jan. 17, 1928.  R. A. ASHMAN  1,656,657

CARBURETOR

Filed March 14, 1923   2 Sheets-Sheet 2

Inventor
Robert A. Ashman,
By William A. Smith, Jr.
Attorney

Patented Jan. 17, 1928.

UNITED STATES PATENT OFFICE.

ROBERT A. ASHMAN, OF REPRESA, CALIFORNIA, ASSIGNOR TO GEORGE H. KELCH AND MARGARET MAXWELL KELCH.

CARBURETOR.

Application filed March 14, 1925. Serial No. 15,671.

This invention relates to a carburetor or fuel gasifying device for use with internal combustion engines. The invention is something more than a mere vaporizer similar to the well-known form of carburetor now in use, and is designed primarily to gasify a raw fuel oil, and in turn to mix the gasified fuel oil with atmospheric air in certain predetermined proportions.

An object of the invention is to provide a device of this character wherein the gasification of the fuel oil takes place in the presence of heat preliminary to the mixing of the fuel with air.

A further object of the invention is to provide a valve controlling means for regulating the flow of raw fuel oil and the flow of atmospheric air, the amount of such fuel oil and air and the relative proportions of each depending upon the speed of the operation of the engine.

A still further object of the invention is to provide a plurality of independent air introduction means, valve controlled, and adjustable in accordance with certain conditions.

In the drawings, Fig. 1 is a side elevation, partly in section, of the present invention.

Fig. 5 is a perspective view of the fuel oil supply valve.

Figure 1:
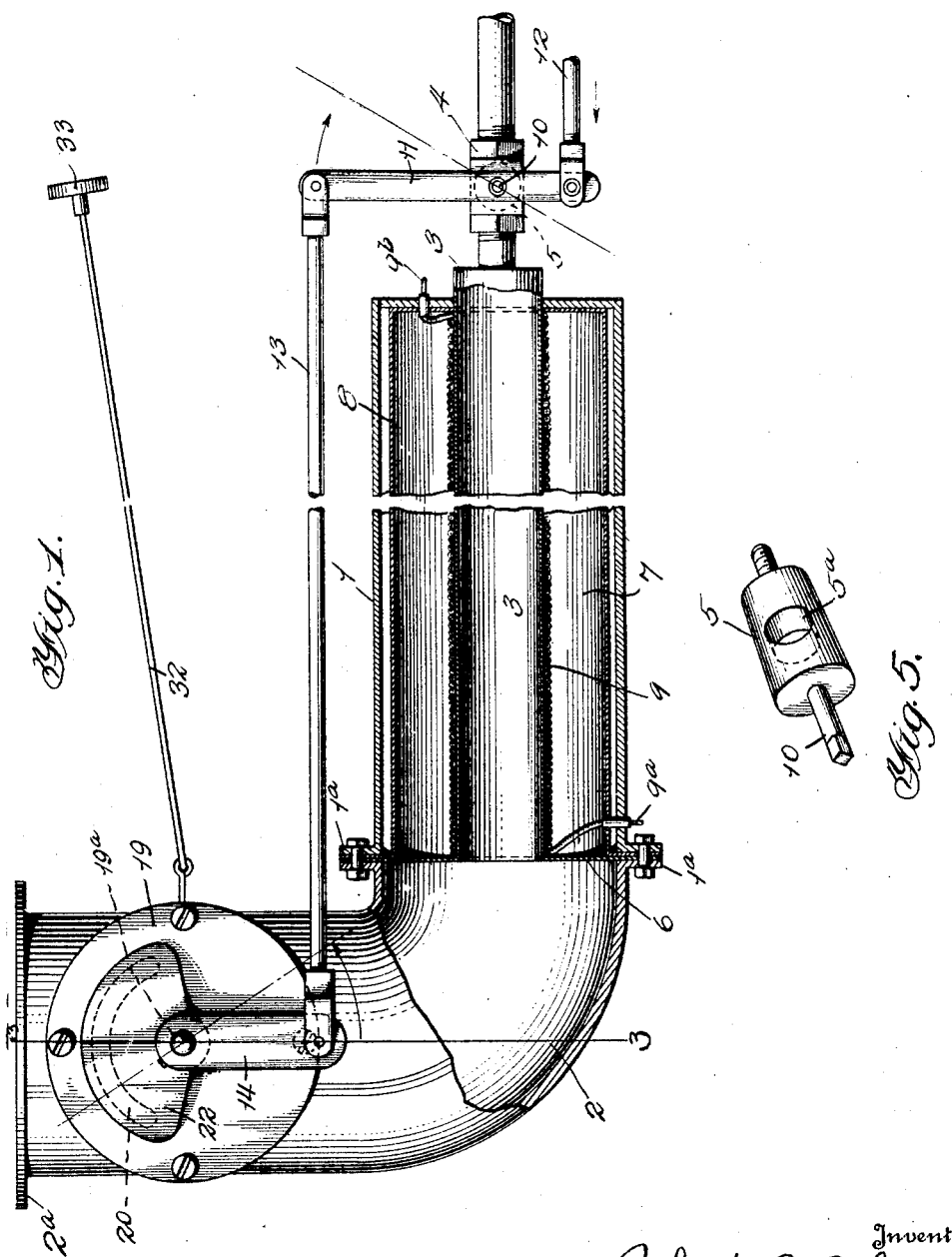
Figures 2, 3:
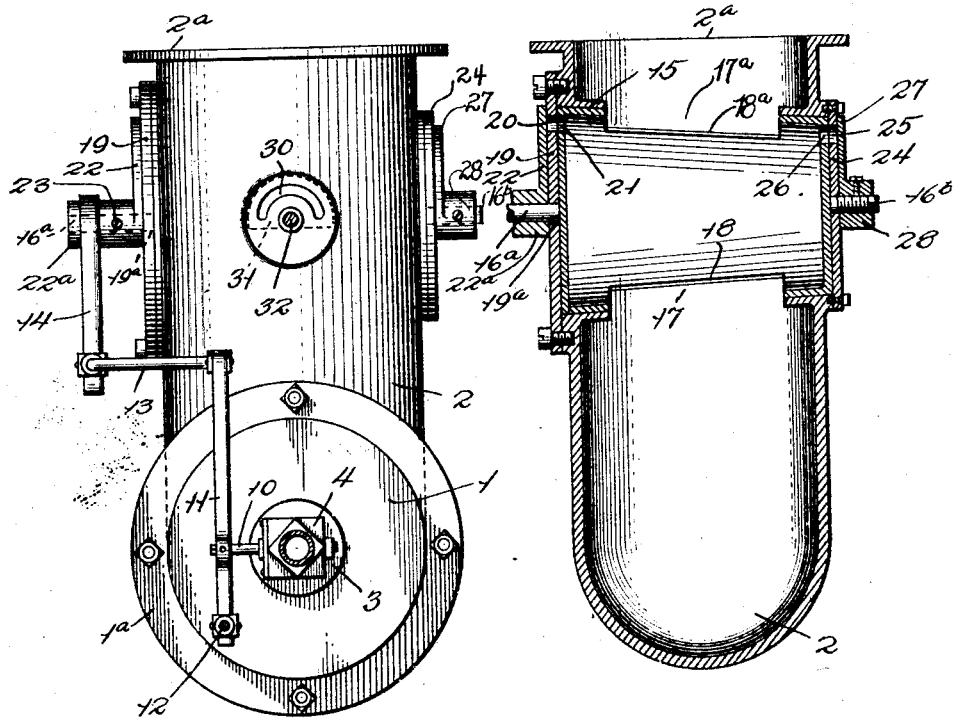
Fig. 2 is an end elevation of the same.
Fig. 3 is a vertical section view on the line 3—3 of Fig. 1.

Referring to the drawings, the numeral 1 indicates the main tube or body of the present invention. The numeral 2 refers to the forward end or hollow body of the device in the form of an elbow, the end 2ª of which is adapted for attachment to the manifold of the internal combustion engine with which the carburetor is used.

Within the tube 1 is a smaller tube 3 which serves as a fuel conduit. At one end the said conduit is reduced and threaded or otherwise attached to a valve block 4, the feed line from the gasoline or other fuel oil supply tank being attached to the opposite end of the said valve block. Within the block 4 is mounted a rotary valve 5, in the form shown in Fig. 5, the said valve having a passageway 5ª therethrough. At its opposite end, the conduit 3 carries a flange 6 which extends to the exterior of the outer tube 1, where it is bolted or otherwise attached to a flange 1ª on the said outer tube.

The rearward end of the main tube 1 is closed by a suitable end plate having a central opening which closely fits the conduit 3 in the manner shown. The space 7 between the conduit 3 and the inner wall of the main tube 1 is a dead air space for the purpose of retaining heat, as will be hereinafter described. A shield 8 of the asbestos or other non-conducting material may be used interiorly of the tube 1 if desired. Spirally wound around the exterior of the conduit 3 is an electric resistance wire 9. One end of said conductor 9 passes through the tube 1, as shown at 9ª, and is connected to a suitable battery or other source of electric current. The opposite end of the conductor passes through the closed end of the tube 1, as shown at 9ᵇ, and is connected to a suitable ground. During the time the engine is idle, the desired current may be received from a storage battery, and during the time the engine is running, from a suitable generator or dynamo used in connection with the engine or independently operated.

The valve 5 is provided with a stem 10 which projects axially from the valve block 4 and is connected to an arm 11. At its lower end the arm 11 is pivotally connected to a rod 12 which in turn connects with the manual operating control of the engine, which in the case of a motor vehicle may be a foot accelerator or hand control. At its upper end, the arm 11 is pivotally connected to a rod 13 which extends forwardly of the device, and is pivotally connected at its forward end with an arm 14 controlling the operation of control valve means to be hereinafter described.

Figure 4:
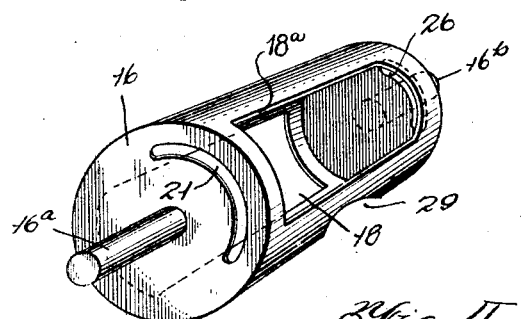
Fig. 4 is a perspective of one of the control valves.

Mounted near the upper end of the elbow 2 of the carburetor is a valve assembly which controls the admission of the atmospheric air to the gasified fuel. The elbow 2 has a passageway 15 therethrough at right angles to the line of flow of the fuel and within this opening 15 is mounted a hollow rotary valve 16, shown in detail in Fig. 4. An opening 17 extends through the bottom portion of the said passageway, and a similar opening 17ª extends through the top of the said passageway. The valve 16 is provided with openings 18 and 18ª positioned at diametrically opposite points through the walls of the valve to form a passageway, in line with the openings 17 and 17ª to permit the flow of fuel through the said valve 16 and upwardly into the intake of the engine to which the carburetor is attached. The valve 16 is preferably tapered in the manner shown and the passageway 15 is correspondingly tapered. Bolted to the widened face of the passageway 15 is a cover plate 19 which has an opening 19ª at its center to permit passage of the valve stem 16ª therethrough. The cover plate 19 is also provided with an air intake opening, preferably, although not necessarily, in the form of an arcuate slot 20, as shown. The opening 20 serves to admit atmospheric air to the interior of the carburetor and cooperates with a like opening 21 in the widened end of the valve 16. Against the exterior face of the cover plate 19 is a regulating segment 22 having a sleeve 22ª mounted upon and surrounding the valve stem 16ª. The segmental portion 22 is adapted to be adjusted to regulate and control the amount of the opening 20 that is to be exposed to the air. A set screw 23 is used to secure the said segment in any desired position, adjustment of the same being dependent upon atmospheric conditions of the outside air. For instance, in winter, the segment 22 will be adjusted to permit less exposure of the opening 20 than would be desirable in summer. At the narrowed end of the valve passageway, a similar plate 24 is attached, the said plate having a like opening 25 therein. The narrowed end of the valve 16 is provided with a corresponding opening 26 which cooperates with the opening 25 in the same manner as the openings 20 and 21 at the opposite end of the valve. A segment 27 is mounted at this end of the valve and is adjusted in the same manner as the segment 22 to regulate the exposure of the opening 25. A nut 28 is threaded upon the threaded end of the valve stem 16ᵇ, for the purpose of holding the valve assembly in position.

In the side of the valve 16, an additional passage 29 is provided, which cooperates with an opening 30 in the rear wall of the elbow 2. A segment 31 is mounted on elbow adjacent the opening 30 and a rod 32 is connected to the said segment 31, the rod extending towards the rear and terminating in a fingerpiece 33 under the control of the operator of the engine. The said opening 30 functions as an auxiliary air valve for use under unusual conditions, and the admission of air through the said opening 30, through the opening 29 in the valve, and into the interior of the valve is regulated by the said segment 31, controlled by the rod 32. In the case of a motor vehicle, the fingerpiece 33 will preferably be mounted on the dash of the vehicle.

The arm 14 is attached to the valve stem 16ª and serves to operate the valve. The rod 13 connecting the arms 11 and 14 provides for the simultaneous operation of the fuel inlet valve 5 and the air mixing valve 16. The rod 13 is preferably so adjusted that the valve 16 will open slightly ahead of the valve 5, so that upon the starting of the engine, the heated fuel contained within the conduit 3, or within the elbow 2, will pass up into the engine before the admission of cold fuel through the valve 5, thus facilitating the starting of the engine in cold weather.

In operation, the fuel oil intering from the supply pipe through the valve 5 and into the conduit 3, is heated in its passage through the said conduit by means of the electric resistance unit 9 surrounding said conduit, and this incoming fuel is caused to become gasified, and in this gasified state passes out of the forward end of the conduit, up through the elbow 2, through the valve 16, where it is mixed with atmospheric air in the desired proportion, the flow of the fuel and the proportion of air admitted being controlled by the valves 5 and 16 respectively, and according to the speed of the engine. It is desired that a distinction be drawn between the gasification of the fuel in the present device, and the ordinary vaporization of fuel in the usual form of carburetor. It will be noted that no float or needle valve is required in the present device, and the number of parts is at a minimum. In the present device clogging or flooding of the carburetor is hardly possible, and the fuel will be found to flow in an uninterrupted stream to the intake manifold. In the present device low grade fuels may be used, and the fuel directed into the intake manifold is so gasified that every particle of the fuel is converted into heat and energy with the result that there is little, if any, carbonization within the cylinders of the engine, and with the further advantage that the engine will be found to operate more smoothly and more economically under adverse weather conditions than is the case with the present type of carburetor.

It is to be understood that the form of my invention herein shown and described is to be taken as a preferred example of the same, and that various changes may be made in the shape, size and arrangement of parts without departing from the spirit of the invention or the scope of the subjoined claim.

Having thus described my invention, what I claim as new and desire to secure by Letters Patent is:

A carburetor comprising a main tube having a closed end and an open end, an elbow having one end portion secured to the open end of said tube, a fuel conduit leading through the closed end of said tube and having an open end disposed adjacent to and communicating with the end of the elbow secured to the main tube, heating means surrounding said conduit, means for supplying fuel only to the closed end of the fuel conduit, a fuel valve controlling the supply of the fuel, the elbow having an air inlet therein and also having an outlet for the gasified mixture of air and fuel, a single valve controlling the inflow of air and the outlet of the mixture and a connection between said last mentioned valve and the fuel valve.

In testimony whereof I hereunto affix my signature.

ROBERT A. ASHMAN.